Jan. 8, 1946. R. E. BOEHLER 2,392,637
METHOD AND APPARATUS FOR DETERMINING SURFACE OF COMMINUTED MATERIAL
Filed Dec. 21, 1942 9 Sheets-Sheet 2

INVENTOR
ROBERT E. BOEHLER,
by: John E. Jackson
his Attorney.

Jan. 8, 1946.  R. E. BOEHLER  2,392,637
METHOD AND APPARATUS FOR DETERMINING SURFACE OF COMMINUTED MATERIAL
Filed Dec. 21, 1942  9 Sheets-Sheet 4

Fig. 8.

INVENTOR
ROBERT E. BOEHLER,
by: John E. Jackson
his Attorney.

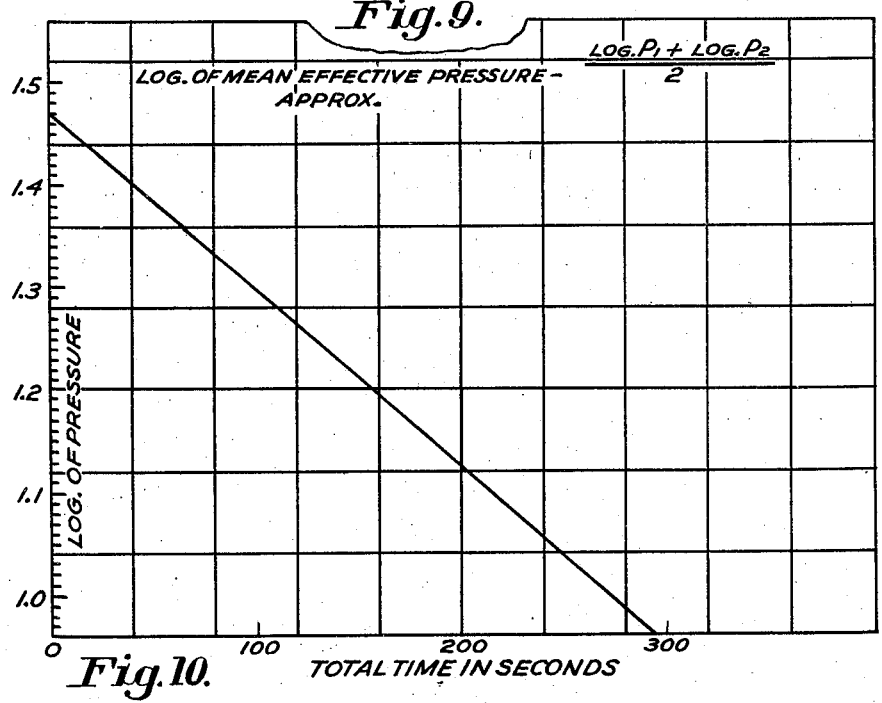
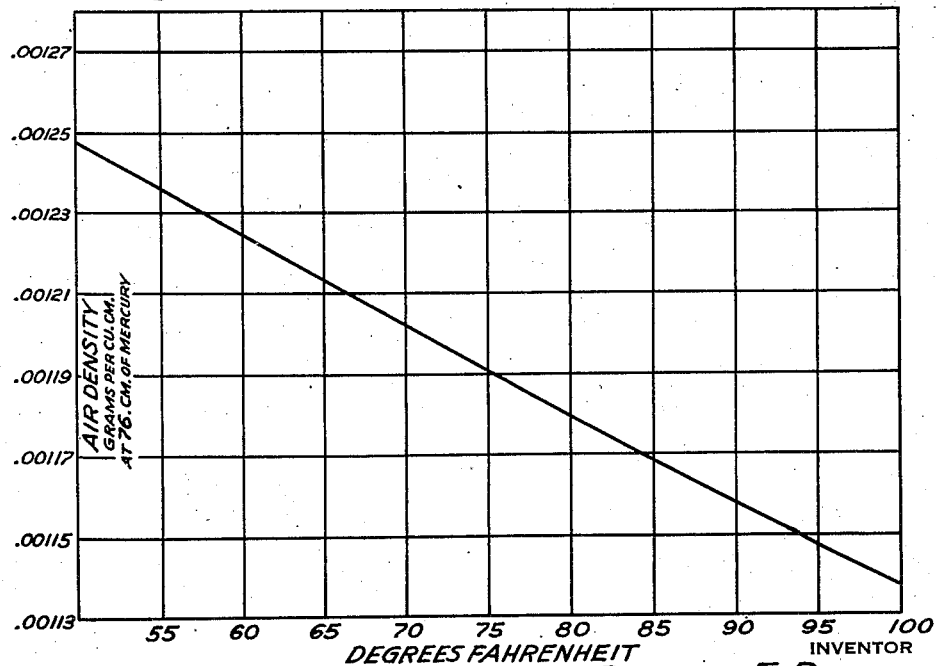

ROBERT E. BOEHLER, INVENTOR
by John E. Jackson
his Attorney.

Patented Jan. 8, 1946

2,392,637

UNITED STATES PATENT OFFICE

2,392,637

METHOD AND APPARATUS FOR DETERMINING SURFACE OF COMMINUTED MATERIAL

Robert E. Boehler, Gary, Ind., assignor to Universal Atlas Cement Company, a corporation of Indiana Application December 21, 1942, Serial No. 469,710

8 Claims. (Cl. 73—38)

In the production of powdered materials, such as cement, importance may be attached to the degree of fineness of grinding of the material, since, in the case of cement, there is a direct relation between the fineness of the cement particles and the setting properties of the cement. Thus, it is generally accepted that the coarser particles in cement are practically inert, and it is only the extremely fine powder that possesses adhesive or cementing qualities. The more finely cement is pulverized, all other conditions being the same, the more sand it will carry and produce a mortar of a given strength.

In the early stages of hardening of cement, only the finer particles have any effect, as water is slow in reaching the interior of the larger particles, thereby delaying the hydraulic action. Also, the finer particles more easily cover the sand grains, making mortar much stronger, and allowing use of larger percentages of sand. Also seasoning can take place more easily with finely ground cement; because of this, fine cement is less liable to unsoundness.

In view of the importance of grinding of certain powders, such as cement, it becomes necessary to make frequent tests on the material dressing the grinding process in order to effect requisite adjustments of the mills in the event that through some cause, the mill is not performing satisfactorily. In view of the fact that such tests should be made frequently during the grinding, it is necessary that they be done in an expeditious manner as the grinding proceeds.

In accordance with the present invention, there are provided a new process and apparatus for determining the fineness of materials such as cement, or for that matter, virtually any comminuted substance that, for any reason, may be desired to be tested for fineness, cement being the illustrative embodiment of the invention which is illustrated and described herein.

A further object of the invention is to provide a method and apparatus which combines speed with sufficient ruggedness of mechanical construction to enable the equipment to be installed immediately adjacent to a grinding mill, for quickly making determinations for effecting required regulation of the grinding operation.

A still further object of the invention is to provide testing equipment which is suitable for use by a person such as a mill operative, and not necessarily by a trained laboratory technician and which eliminates the use of delicate laboratory apparatus.

It may be mentioned in this connection that a still further object of the invention may be stated to be the provision of equipment on which there may be taken direct readings in terms of surface, thereby avoiding the necessity for calculations.

The present invention is based upon the fact that fineness of the particles is measured by determining the total surface presented by a standard bed of the powder, as determined by pressures required to force a penetrating fluid, such as air, through such standard bed, and reading the results in terms of surface.

This is accomplished on the basis of the Carman equation for determining surface by the permeability of liquids through beds of granules. In the present invention, instead of forcing a liquid through standard beds, air is used as the permeating fluid, and as the density of air is expressed in terms relative to the density of fluids, the fineness of the granules also is assumed to be relative.

P. C. Carman (Journal of the Society of Chemical Industry, vol. 57, 1938, page 225; and vol. 58, 1939, page 227) derived the principles involved, and the present invention embraces the method, and inseparately therefrom, the calculations that are involved, together with a compact apparatus for carrying out the method as stated above, the invention being predicated upon the relations expressed by the aforesaid Carman equation for determining surface by the permeability of liquids through beds of granules. When air is used as the permeating medium, and its density is expressed in terms relative to the density of fluids, the fineness also may be assumed to be relative.

In the Carman equation, the variables affecting specific surface are porosity, kinematic viscosity and permeability. Their relation of each other is as follows:

DETERMINATION OF SPECIFIC SURFACE BY APPLICATION OF CARMAN'S EQUATION TO THE BOEHLER SINGLE MANOMETER SURFACE METER

The following considerations explain the method and calculations involved in determining the fineness of materials in terms of square centimeters per gram, with the single manometer air surface meter of the present invention.

The following calculations are based upon the Carman equation for determining surface by the permeability of liquids through beds of granules. When air is used as the permeating medium and its density is expressed in terms relative to the density of fluids, we assume the fineness also to be relative.

In the Carman equation, the variables affecting specific surface are porosity, kinematic viscosity, and permeability. Their relation to each other is as follows:

$$S_0 = \sqrt{\frac{g}{kKV} \frac{E^3}{(1-E)^2}}$$

where $S_0$ = surface in sq. cm. per cu. cm.
$g$ = acceleration due to gravity = 980 cm. per sec. per sec.
$E$ = porosity, that is, volume of voids per unit volume of bed, in cu. cm. per. cu. cm.
$k$ = a constant, numerically 5.0
$K$ = permeability, that is, apparent linear velocity per unit hydraulic gradient, in cm$^4$/gram/sec.
$V$ = kinematic viscosity of the fluid in sq. cm. per sec.

The specific surface may also be expressed in sq. cm. per gram by dividing both sides of the equation by the density of the material. The constants $g$ and $k$ may be combined and removed from under the radical sign, giving the equation as follows:

$$S_w = \frac{S_0}{d} = \frac{14}{d}\sqrt{\frac{E^3}{KV(1-E)^2}}$$

where $d$ = density of the material

In the development of the present invention, it was necessary to examine each of the variables and apply them appropriately to the instrument of the present invention. The following description shows the method used in determining:

1. Average or mean- effective- pressure
2. Total volume of the air system.
3. Volume of air passing through sample
4. The porosity factor E
5. The kinematic viscosity factor V
6. The permeability factor K
7. Apparent linear velocity
8. Unit hydraulic gradient
9. Surface—porosity correction number "$a$"

Since the air pressure is constantly changing as a surface test is being made, it is nececssary to find the average or mean-effective-pressure in order to determine the unit pressure gradient which enters into the valve for permeability, and the air density which enters into the valve for kinematic viscosity.

As used in this article, the mean-effective-pressure is that valve of pressure which, if held constant, would pass the same volume of air through the sample in the same interval of time.

THE MEAN-EFFECTIVE PRESSURE

Time measurements were taken as the pressure decreased and the readings tabulated in Table 1 below.

The logarithms of pressure were plotted against the total time in Fig. 9 of the accompanying drawings referred to hereinafter, and the approximate straight line indicated that the relation between pressure and time could be approximately represented by:

$$P = ce^{bt} \quad (1)$$

The mean-effective-pressure acting between points $P_H$ and $P_L$ is found by determining the area below the curve between the limits $P_H$ and $P_L$ and dividing by the time interval between these points.

The area =

$$\int_L^H P\, dt = \int_L^H ce^{bt}\, dt = \left[\frac{ce^{bt}}{b}\right]_L^H = \left[\frac{P}{b}\right]_L^H = \frac{P_H - P_L}{b}$$

Then mean-effective pressure =

$$\frac{P_H - P_L}{b} \div (t_H - t_L)$$

Finding the value of $b$:

$$\frac{P_H - P_L}{(t_H - t_L)_b} \quad (2)$$

From (1)

$$\log P_H = \log c + bt_H \log e$$
$$\log P_L = \log c + bt_L \log e$$

Subtracting $$\log P_H - \log P_L = b \log e\, (t_N - t_L)$$

or $$b = \frac{\log P_H - \log P_L}{(t_H - t_L) \log e} \quad (3)$$

Substituting (3) in (2)
Mean-effective pressure =

$$\frac{P_H - P_L}{(t_H - t_L)} \cdot \frac{(t_H - t_L) \log e}{\log P_H - \log P_L} = \frac{(P_H - P_L) \log e}{\log P_H - \log P_L}$$

Mean-effective pressure =

$$\frac{P_H - P_L}{\log P_H - \log P_L} 0.4343 \quad (4)$$

Table 1

| Pressure drops | Average pressure | Observed time | Cumulative observed time | Log. of ave. press. |
|---|---|---|---|---|
| 1 | 2 | 3 | 4 | 5 |
| 29-28 | 28.5 | 7.8 | 7.8 | 1.4549 |
| 28-27 | 27.5 | 8.4 | 16.2 | 1.4391 |
| 27-26 | 26.5 | 8.8 | 25.0 | 1.4234 |
| 26-25 | 25.5 | 8.6 | 33.6 | 1.4065 |
| 25-24 | 24.5 | 10.6 | 44.2 | 1.3390 |
| 24-23 | 23.5 | 9.6 | 53.8 | 1.3710 |
| 23-22 | 22.5 | 10.6 | 64.4 | 1.3522 |
| 22-21 | 21.5 | 10.8 | 75.2 | 1.3324 |
| 21-20 | 20.5 | 12.4 | 87.6 | 1.3119 |
| 20-19 | 19.5 | 11.4 | 99.0 | 1.2900 |
| 19-18 | 18.5 | 14.4 | 113.4 | 1.2673 |
| 18-17 | 17.5 | 14.0 | 127.4 | 1.2431 |
| 17-16 | 16.5 | 14.6 | 142.0 | 1.2174 |
| 16-15 | 15.5 | 17.0 | 159.0 | 1.1903 |
| 15-14 | 14.5 | 17.8 | 176.8 | 1.1614 |
| 14-13 | 13.5 | 19.6 | 196.4 | 1.1305 |
| 13-12 | 12.5 | 20.6 | 217.0 | 1.0971 |
| 12-11 | 11.5 | 21.8 | 238.8 | 1.0661 |
| 11-10 | 10.5 | 25.6 | 264.4 | 1.0258 |
| 10- 9 | 9.5 | 28.0 | 292.4 | 0.9780 |

FINDING TOTAL VOLUME OF THE AIR SYSTEM

The total volume of the air system is calculated by determining the time it takes the mercury column to drop from point H to point L with and without a displacement plug of known volume inserted into the air system by using the same sample for both tests as follows:

where $T_1$ = time of drop without displacement plug.
$T_2$ = time of drop with displacement plug.
$V_1$ = total volume of air system.
$V_2$ = volume of displacement plug.

then $T_1 - T_2$ = time difference representing the effect of placing the plug into the system.

$\frac{T_1}{T_1 - T_2}$ = ratio of total volume to plug volume.

hence $$V_1 = \left(\frac{T_1}{T_1 - T_2}\right) V_2$$

Since the total volume of the system is changing by a small amount as the mercury drops from H. to L, due to the mercury in the column, the calculated total volume is apparently the volume when the mercury is midway between H and L.

It is possible to increase accuracy in finding the volume of the air system if a large portion of the total volume is displaced. Provision has been made in the design of the air chamber to permit mercury or water of known volume to be admitted to the air system instead of a displacement plug. By this means more than half of the total volume may be displaced.

VOLUME OF AIR PASSING THROUGH SAMPLE

Knowing the total volume of the air system ($V_1$), the volume of free air passing through the sample when the pressure drops from point H to point L can be calculated as follows:

Let $P_1$ = absolute pressure at point H
$P_B$ = the barometric pressure then $\frac{P_1}{P_B}$ = the number of atmospheres above absolute zero contained in the air system at point H $\frac{P_1}{P_B} - 1$ = the number of atmospheres above barometric pressure contained in the air system since $V_1$ = the total volume of the air system then $\left(\frac{P_1}{P_B} - 1\right)V_1$ = total volume of free air contained in the air system at point H Let $P_H$ = gage pressure at point H and $P_L$ = gage pressure at point L
$P_H - P_L$ = drop in gage pressure while testing
$P_H - 0$ = total drop in gage pressure available — $P^3$ then $\frac{P_H - P_L}{P_H}$ = proportionate part of total drop available which is used in testing Therefore, the total volume of free air contained in the system at point H multiplied by the proportionate part of total pressure drop available which is used in testing will equal the volume of air passing through the sample when testing.

or $$V_4 = \left(\frac{P_1}{P_B} - 1\right)V_1\left(\frac{P_H - P_L}{P_H}\right)$$

where $V_4$ = volume of air passing through the sample since $P_1 = P_B + P_H$ the formula can be reduced to $$V_4 = \left(\frac{P_H - P_L}{P_B}\right)V_1$$

THE POROSITY FACTOR E

The porosity is the ratio of the volume of voids to the total volume of the bed. Knowing the dimensions of the cell, the weight of sample, and the density of the material, the porosity is found as follows:

Let $w$ = weight of sample, in grams.
$d$ = density of material, in grams/cu. cm.
$A$ = area of cross-section of cell, in sq. cm.
$L$ = length of cell occupied by sample, in cm.

then $AL$ = total volume of the bed.

$\frac{w}{d}$ = volume occupied by solid particles.

$AL - \frac{w}{d}$ = volume of voids.

Hence $$E = \frac{\text{volume of voids}}{\text{volume of bed}} = \frac{AL - \frac{w}{d}}{AL} = 1 - \frac{\frac{w}{d}}{AL} = 1 - \frac{w}{dAL}$$

By using the same cell on all tests, and by assigning proper weights of sample for the ranges of surface of the various materials to be tested, $w$, $A$, and $L$ will be constants and the porosity factor can be brought down to contain one variable, the density, which must be carried to the final equation for surface. It has been found that when the density varies slightly, the surface results change considerably.

It was also found that as the porosity was lowered, within a certain range, the unit surface, as calculated by Carman's Equation, increased while using the same material. Obviously, the porosity exponent of 3 does not hold constant. Investigation of the curves obtained from various samples of known surfaces led to the determination of correction exponents designated as $x$ in Figure 12 of the accompanying drawings. For the purpose of shortening the calculations, the same relation was maintained by retaining the Carman exponent of 3, and substituting the correction number designated as $a$ in Figure 13 of the accompanying drawings; both of which views will be referred to in detail hereinafter.

It was also found that the amount of increase in surface, as mentioned above, is greater with higher surfaces. Therefore, the correction exponent, and the correction number, change depending upon the surface.

Further, it was found that the porosity must be low enough to prevent the possibility of having a greater air pressure at point T on the manometer than the pressure used in compressing the sample. Figure 13 shows the upper limits of porosity permissible for various surface ranges with this instrument.

THE KINEMATIC VISCOSITY FACTOR V

By definition, the kinematic viscosity is the ratio of the absolute viscosity to the density of the fluid.

or $V=$

Where $V$ = kinematic viscosity in sq. cm./sec.
$n$ = absolute viscosity in grams/cm./sec.
$P$ = density of the fluid (air) in grams/cu. cm.

From Figure 11 of the accompanying drawings, the absolute viscosity corresponding to the existing room temperature may be found directly.

Figure 10 of the accompanying drawings shows the density of air at 76 cm. of mercury. Since the pressure, and therefore the density of air is not constant as it passes through the sample, the average density is therefore based upon one-half of the mean-effective pressure across the sample. As the mean-effective-pressure was calculated for gage pressure and air density is a function of absolute pressure, correction can be made by using the factor $$\frac{\frac{P_c}{2}}{P_B}+1$$

where $P_c$=mean-effective-pressure in cm. of mercury.
$P_B$=barometric pressure in cm. of mercury.

Also, as the reading for density obtained from Figure 10 will be on the basis of 76 cm. of mercury, this reading is corrected for other barometric pressures by using the factor $$\left(\frac{P_B}{76}\right)$$

Hence $$P=P'\left(\frac{\frac{P_c}{2}}{P_B}+1\right)\left(\frac{P_B}{76}\right)$$

or $P=P'$ (.006579) ($P_c+2P_B$)

where $P'$ is the value taken from Figure 9.

THE PERMEABILITY FACTOR K

The permeability factor is the ratio of the apparent linear velocity of the fluid (air) to the unit hydraulic gradient across the bed.

Considering first the apparent linear velocity:

Apparent linear velocity=

$$\frac{\frac{\text{vol. of air passing}}{\text{seconds required}}}{\text{cross-sectional area}}$$

For any one instrument, the volume of air passing will be constant when the points H and L on the manometer are fixed and there are no great variations in the barometric pressure. The cross-sectional area of the bed is constant as determined by the physical dimensions of the cell used. Time is the variable, and when a cycle counter is used for its measurement, the frequency constant must be introduced in converting seconds to cycles.

The unit hydraulic gradient is the pressure drop per unit length of the bed. Since the sample is compressed to the same thickness before each test, the depth or length of the bed is a constant. The pressure drop across the bed is the mean-effective-pressure previously determined.

Hence,

Unit hydraulic gradient $=\frac{P_G}{L}$ where $P_G$=mean-effective-pressure in grams/sq. cm.

and $L$=depth of bed in cm.

Thus $$K=\frac{\frac{\frac{\text{volume of air passing}}{\text{time required}}}{\text{cross-sectional area of bed}}}{\frac{\text{mean-effective-pressure}}{\text{depth of bed}}}$$

$$=\frac{\text{volume of air passing}\times\text{depth of bed}}{\text{mean-effective-pressure}\times\text{area of bed}\times\text{time required}}$$

$$=\frac{\left(\frac{P_H-P_L}{P_B}\right)V_1L}{P_GAt}$$

$$K=\frac{(P_H-P_L)V_1L}{P_BP_GAt}$$

It will be found in supplying the numerical values that K can be reduced to $$K=\frac{\text{a constant}}{t}$$

The Carman equation as applied to the apparatus of the present invention now becomes:

$$S_w=\frac{14}{d}\sqrt{\frac{tAP_GPE^3}{V_4Ln(1-E)^2}}$$

where $$E=1-\frac{w}{dAL}$$

$d$=density of the material, in grams per cu. cm.
$w$=weight of sample, in grams.
$A$=cross-sectional area of bed, in sq. cm.
$L$=depth of bed, in cm.
$t$=time, in seconds, for mercury drop from H to L.
$P_G$=mean-effective-pressure in grams per sq cm.
$P$=density of the permeating fluid (air).
$V_4$=volume of air passing through the sample, in cu. cm.
$n$=absolute viscosity of the air, in grams per cm. per sec.

Other symbols referred to herein are the following:

$P_B$=barometric pressure, in cm. of mercury.
$P_H$=gage pressure at point H, in cm. of mercury.
$P_L$=gage pressure at point L, in cm. of mercury.
$P_c$=mean-effective-pressure in cm. of mercury.
$P_1$=absolute pressure at point H.
$V_1$=total volume of the air system, in cu. cm.
$V_2$=volume of the displacement plug in cu. cm.
$T_1$=time without displacement plug, in seconds or cycles.
$T_2$=time with displacement plug, in seconds or cycles.
$T_H$=total time at point H in seconds or cycles.
$T_L$=total time at point L in seconds or cycles.
$P'$=density of air at 76 cm. of mercury taken from Fig. 9.

CALIBRATION OF THE INSTRUMENT

The height of the mercury column at point H was 98.08 cm. and at point L, 51.08 cm. These measurements were obtained after making allowance for the change in level in the mercury pot due to change in the height of the column, and the volume displaced by the wires for the cycle-counter contacts.

Mean-effective-pressure=

$$\frac{P_H-P_L}{\log P_H-\log P_L}\times.4343$$

$$=\frac{89.08-51.08}{1.9489-1.70825}\times.4343$$

Therefore $P_c$=68.58 cm. of mercury.

and $P_G$=68.58×13.59=932 grams/sq. cm.

The constants for the permeability cell are:

$A$=9 sq. cm.
$L$=5 cm.

In determining the total volume of the air system, several displacement plugs, machined from the same piece of brass shafting, were weighed. The weights of the plugs which had tapped holes for the set screws, were compared to the weight of a solid plug of the same outside dimensions. Using the calculated volume of the solid plug and the ratios of weights, the volumes of the plugs with tapped holes were obtained. The volumes of the set screws were calculated from their weights and density, and added to the volumes for the respective displacement plugs. Choosing three plugs having the greatest relative differences in volume, and taking time readings as the mercury dropped from point H to an arbitrary point about 6 inches above the mercury pot, first without the plug, and then with the plug, the total volume of the air system was found from the average of the readings and the known volumes of the respective plugs. The point about 6 inches above the pot was selected in order to lengthen the time and reduce the errors in readings. The cycle counter was used as a check against the stop-watch results. As developed, the volume of the air system was found from $$V_1 = \left(\frac{T_1}{T_1 - T_2}\right) V_2$$

| | $T_1$ | $T_2$ | $\frac{T_1}{T_1-T_2}$ | Volume of plug $V_2$ | Volume of air system $V_1 = \left(\frac{T_1}{T_1-T_2}\right) V_2$ | Percent error based on 535.7 c. c. |
|---|---|---|---|---|---|---|
| Cycle counter | 2294.1 | 2137.7 | 14.66 | 36.9344 | 541.7 | 1.12+ |
| | 2294.1 | 2177.6 | 19.70 | 27.2996 | 537.5 | 0.336+ |
| | 2294.1 | 2170.0 | 18.50 | 28.9752 | 535.9 | 0.0374+ |
| Stop watch | 132.6 | 123.35 | 14.34 | 36.9344 | 530.0 | 1.075− |
| | 132.6 | 126.15 | 20.55 | 27.2996 | 561.0 | 4.73+ |
| | 132.6 | 125.40 | 18.42 | 28.9752 | 533.5 | 0.412− |
| Average | | | | | 539.9 | Total 4.7364+ |
| Average without 561.0 | | | | | 535.7 | Total 0.0064+ |

These results indicate the volume of the air system to be very nearly 536. cu. cm.=$V_1$.

Knowing the volume of the air system, the gage pressures at points H and L, and the barometric pressure, the volume of air passing through the sample can be found by the method developed as afore-mentioned, i. e.

$$V_4 = \left(\frac{P_H - P_L}{P_B}\right) V_1 = \left(\frac{89.08 - 51.08}{74.68}\right) 536$$

$$V_4 = 272.7 \text{ cu. cm.}$$

The permeability factor K referred to in foregoing equations becomes:

$$K = \frac{(P_H - P_L) V_1 L}{P_B P_G A t}$$

$$= \frac{(89.08 - 51.08) 536 \times 5}{74.68 \times 932 \times 9 \times \text{seconds}} = \frac{.1625}{\text{seconds}}$$

$$= \frac{9.75}{\text{cycles}} \text{ (for 60 cycles/sec.)}$$

KINEMATIC VISCOSITY

The kinematic viscosity V, is found to contain the factors of temperature, air density, mean-effective-pressure, barometric pressure and constants. For the room temperature of 70° F., the air density taken from Figure 10 is .0012015 or $12.015 \times 10^{-4}$ grams/cu. cm. at 76 cm. of mercury. The barometer reading was 74.68 cm. of mercury. From Figure 11, the absolute viscosity of air at 70° F. is .00000018605 or $18.605 \times 10^{-8}$ grams per cm. per sec.

From formula:

$$(.006579)(P_e + 2P_B)$$

$$= (12.015 \times 10^{-4})(.006579)(68.58 + 2 \times 74.68)$$

$$= 172000 \times 10^{-8}$$

Hence $$V = \frac{n}{P} = \frac{18.605 \times 10^{-8}}{172000 \times 10^{-8}}$$

$$V = .0001082$$

Using a 72 gram sample of Standard Portland cement having a density of 3.135 grams per cu. cm., the time of mercury drop from H to L was 1809.1 cycles.

For this sample $$E = 1 - \frac{W}{dAL} = 1 - \frac{72}{3.135 \times 9 \times 5} = .4896$$

$$K = \frac{9.76}{\text{cycles}} = \frac{9.75}{1809.1} = .00539$$

This sample was known to be in the 4000 air surface range. From Figure 13, the correction number "$a$" for this range and porosity is .9862.

Hence $$S_w = \frac{14}{d} \sqrt{\frac{E^3}{KV(a-E)^2}} = \frac{14}{d} \times \frac{E\sqrt{E}}{a-E} \sqrt{\frac{1}{KV}}$$

$$= \frac{14}{3.145} \times \frac{.4896\sqrt{.4896}}{.9862 - .4896} \sqrt{\frac{1}{.00539 \times .0001082}}$$

$$= 4025 \text{ sq. cm./gram}$$

Under the same conditions but replacing the 72 gram sample with a 76 gram sample of the same cement, we have $$E = 1 - \frac{76}{3.135 \times 9 \times 5} = .4615$$

and $$t = 2539.8 \text{ cycles}$$

By the method as shown previously, $S_w = 4036$ sq. cm./gram.

The discrepancy between the two results amounts to 11 sq. cm./gram or approximately 0.273%. It could possibly be accounted for in the plotting of the correction numbers in Figure 13, or in the dropping of small remainders during calculation, or in reading the curves.

The surface obtained by the Wagner method for this cement sample was 1763. The ratio between the method of the present invention and the Wagner method was 2.28.

SPECIFIC GRAVITY

Regardless of what is done with the instrument to obtain precision, the results accomplished regarding surface are only approximate unless the density of the sample is known. Tests have shown that a given standard cement varies from 3.06 to 3.15.

In the Carman equation, the density is used in three places, and a change of 1% in density gives a corresponding change of approximately 1½% in surface.

The present method of determining density in the laboratory requires 2½ to 3 hours with the result that surface determinations for control purposes from day to day are based upon an arbitrary figure of 3.15.

In order to obtain the density without involving too much time and labor, in connection with the present invention, there has been developed a faster method which requires approximately 20 minutes. For practical purposes, this could be done daily and would result in more dependable surface determinations. The method for determining density is as follows:

*Specific gravity by centrifuge method*

Two samples of 175 grams each are vibrated into heavy glass bottles containing enough fluid to cover the samples. The bottles are then balanced by adding fluid and placed in the centrifuge for one minute to drive out the entrained air and compact the samples to an extremely dense state. The volume occupied by the sample is found by determining the volume of fluid which the sample displaces. This can be done quickly by taking from a prepared graph, the weight of fluid for the full bottle at the prevailing temperature, and deducting the net weight of fluid which was added above the sample to fill the bottle. From another graph of temperature, weight and volume, the volume of the sample is found from the weight of the displaced fluid. Then, the ratio of 175 to the volume just found, is the density of the sample.

STANDARDIZATION OF INSTRUMENTS

In the construction of a number of instruments it is to be expected that their total volumes will vary. Nevertheless, it is possible to keep the mean-effective-pressure and the volume of air passing the sample the same for all instruments by properly locating points H and L. When this is done, all instruments will have identical characteristics.

A practical method of locating points H and L to maintain the required volume of air passing the sample, is by making use of the approximately linear function, throughout the normal operating range, of log P versus total time. As the total volume varies directly as the total time, the logs of $P_H$ and $P_L$ can be established by dividing this total time equally across the point of log $P_c$, the standard mean-effective-pressure.

From the calibration of the first instrument, we have:

$P_c$ = mean-effective pressure.
$V_1$ = total volume of the air system.
$P_H$ = pressure at point H.
$P_L$ = pressure at point L.

and assuming linear relation we have:

$$\log P_c = \frac{\log P_H + \log P_L}{2}$$

solving for log $P_H'$ $2 \log P_c = \log P_H + \log P_L$
$2 \log P_c = 2 \log P_H + \log P_L - \log P_H$
$2 \log P_H = 2 \log P_c + \log P_H - \log P_L$ $$\log P_H = \log P_c + \frac{\log P_H - \log P_L}{2}$$

$$\log P_H = \log P_c + \frac{V_1 (\log P_H - \log P_L)}{V_1 \times 2} \quad (1)$$

and by the same method:

$$\log P_L = \log P_c - \frac{V_1 (\log P_H - \log P_L)}{V_1 \times 2} \quad (2)$$

Since the total time varies directly as the volume of the air system, then (log $P_H$ — log $P_L$) will vary directly as the volume of the air system, assuming the straight line relation. To keep the volume of air passing the sample constant, the product of the volume of the air system and the difference of the logs of the pressures must be constant.

Hence $$V_1(\log P_H - \log P_L) = C, \text{ a constant} \quad (3)$$

Substituting (3) in (1) and (2) we have $$\log P_H = \log P_c + \frac{C}{V_1 \times 2}$$

and $$\log P_L = \log P_c - \frac{C}{V_1 \times 2}$$

If $V_1'$ = volume of air system of a second instrument
$P_H'$ = pressure at point H of a second instrument
$P_L'$ = pressure at point L of a second instrument then $$\log P_H' = \log P_c + \frac{C}{V_1' \times 2}$$

$$\log P_H' = \log P_c + \frac{V_1 (\log P_H - \log P_L)}{V_1' \times 2}$$

and $$\log P_L' = \log P_c - \frac{V_1 (\log P_H - \log P_L)}{V_1' \times 2}$$

$P_H = 89.08$     $\log P_H = 1.9497$
$P_L = 51.08$     $\log P_L = 1.7082$
$P_c = 68.58$     $\log P_c = 1.8358$
$V = 536$ then $$\log P_H' = 1.9497 + \frac{536(1.9497 - 1.7082)}{V_1' \times 2}$$

$$\log P_H' = 1.9497 + \frac{129.444}{2V_1'}$$

and $$\log P_L' = 1.9497 - \frac{129.444}{2V_1'}$$

APPLICATION TO MILL CONTROL

When the density of the material has been determined, a constant for the instrument can be used to simplify the calculations and obtain surface results with speed and sufficient accuracy for mill control purposes.

To find the instrument constant, the specific surface is calculated once for the prevailing conditions. While the same weight of sample is used, the surface will vary as the square root of the time, assuming all other factors remain unchanged. Then $$S_w = C\sqrt{\text{seconds}}$$

and $$C = \frac{S_w}{\sqrt{\text{seconds}}}$$

where $S_w$ = the calculated specific surface.
C = the instrument constant for a given density and weight of sample.

Approximate surface results may then be obtained by taking the product of the timer dial reading and the instrument constant.

If it should seem desirable to assume a constant density of material, the timer dial may be graduated in specific surface, giving a direct reading instrument of sufficient accuracy for mill control.

CALIBRATION OF THE INSTRUMENT TO THE WAGNER TURBIDIMETER

Using two 72-gram samples having reasonably well spread values of Wagner surface, the time required for each sample in the air surface meter is taken. Since the square root of the seconds is a straight line function to surface, a graph of Wagner surface vs. square root of seconds can be constructed using the two coordinate points to determine the slope of the line. The square root of seconds corresponding to the cardinal points of Wagner surface can be taken from the graph. Figure 14 is an example of such a graph.

By squaring the values of square root of seconds, a curve can be constructed for seconds vs. Wagner surface, as shown in Figure 15. From this curve a surface scale can be placed on the timer dial to indicate Wagner surface directly.

With reference to the foregoing, attention is called to the accompanying drawings, wherein:

Figure 8 is a view of the apparatus of Figure 1 rendered portable.

Figure 9 is a graph obtained by plotting logarithms of pressure against total time.

Figure 10 is a graph showing the density of air at various temperatures at 76 centimeters of mercury.

Figure 1:
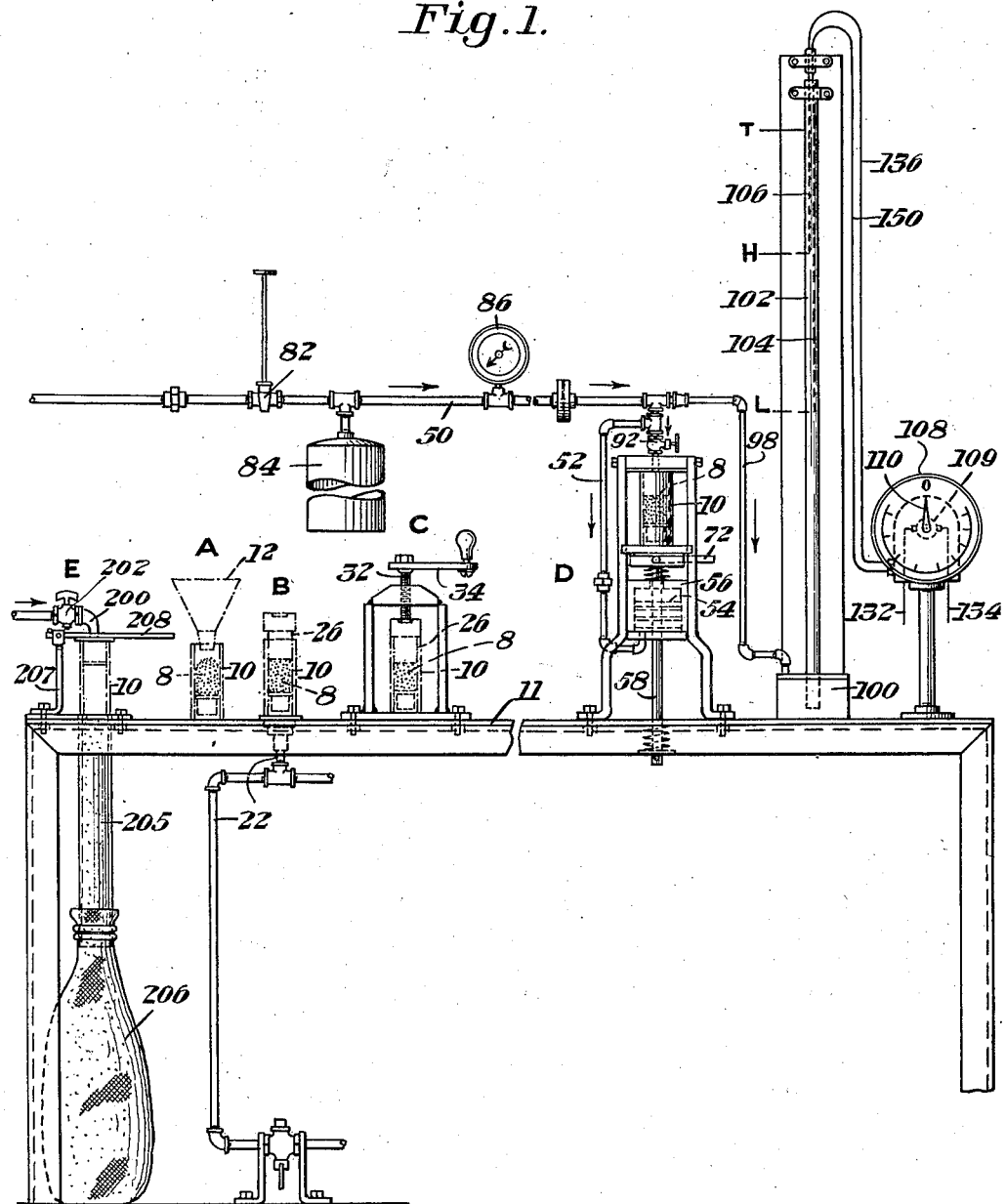
Figure 1 represents a side elevation of an apparatus for practicing the method of the present invention.
Figure 2:
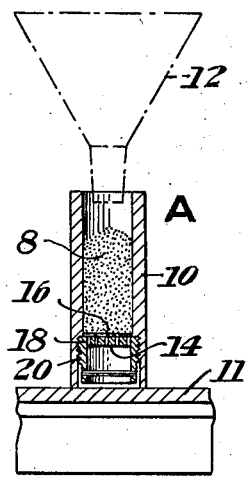
Figure 2 is a sectional elevation of the sample-receiving cylinder, showing a sample of powder introduced therein.

Referring more particularly to the drawings, and first to Figures 1 to 5 inclusive, a sample of powder to be tested which has been indicated at 8 is introduced into a cylindrical cup 10, placed at a sample-filling station A on a table 11, through a funnel 12 or other suitable introducing means. The cup 10 is adapted to sit on table 11 and is provided with a perforated bottom 14, the perforations being covered with a layer of filter paper or fine-meshed cloth for retaining the powder, this being indicated at 16. The bottom 14 preferably is made removable by forming it as a part of a bracket 18 which is threaded into the bottom portion of the sleeve, as is indicated by threads 20.

Figure 3:
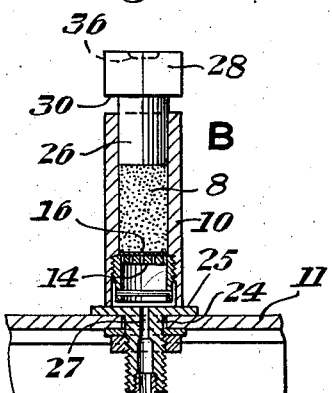
Figure 3 is a sectional elevation showing the first step of preparing the sample.
Figure 4:
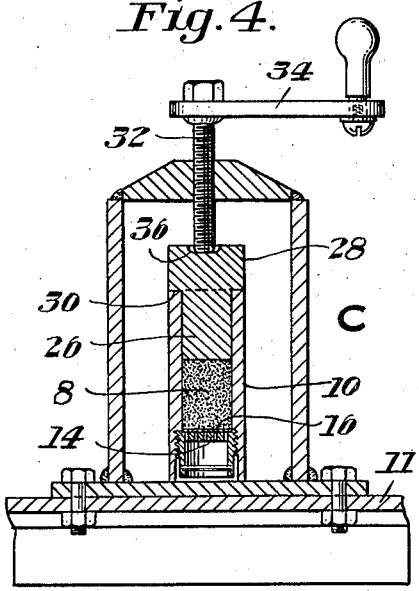
Figure 4 is a sectional elevation showing completion of preparation of the sample.
Figure 5:
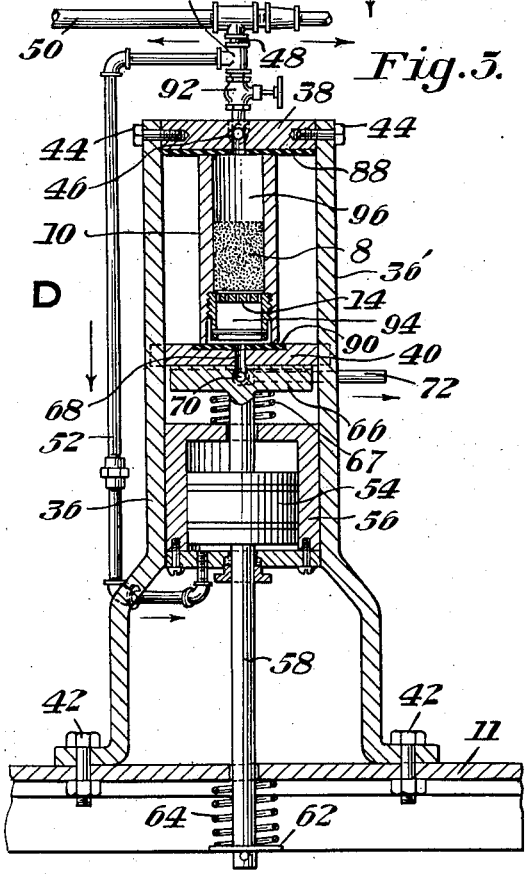
Figure 5 is a sectional elevation of the sample mounted in the test frame for testing.
Figure 6:
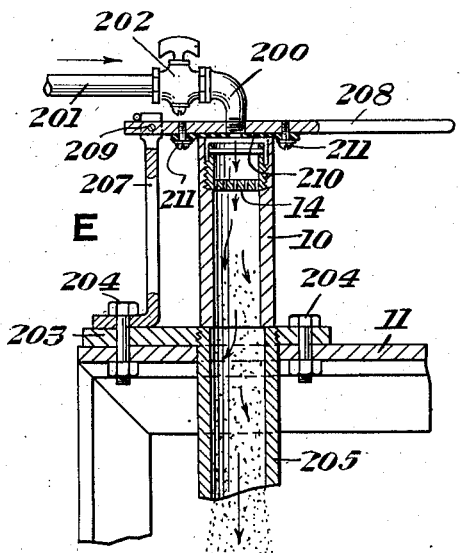
Figure 6 is a sectional elevation showing a method of removing the sample from the cylinder.

As is shown in Figure 3, the table 11 is provided with a suction station B which is immediately adjacent to the sample-filling station. The suction station includes a suction line 22, which opens at the top of table 11 through a suitably apertured fitting 24, the top of which fitting forms a plate 25 having a hole 27 therethrough, the plate 25 being adapted to receive the cylinder 10 with the hole 27 in communication with the interior of the cylinder for evacuation thereof.

The cylinder 10, containing the powder sample 8, is fitted with a piston plug 26, which is milled so as to have a close sliding fit in the cylinder. The piston plug 26 has an enlarged head 28 which forms an annular shoulder 30 adapted to seat on the end of the cylinder 10 when the powder sample 8 is compressed fully.

The suction station B is located immediately adjacent to the station A and the cylinder 10 with the piston plug 26 and sample 8 therein is placed over hole 27, so that when suction is applied through line 22, entrained air is removed from the powder sample, thus initially reducing the volume of powder and causing the piston plug 26 to follow downwardly until the shoulder 30 almost reaches contact with the top of the cylinder 10.

It is evident that as air leaves the powder, mobility of the solid particles produces flow thereof from the cylinder wall downwardly and towards the center, and all layers from bottom to top represent as nearly uniform packing as can be attained at this stage. The sample so compacted remains as a cylinder slightly less in diameter than its metal container, its upper surface under the piston plug being slightly higher than required.

Consequently, in order to finish compacting, the cylinder 10 with its contained partially compressed sample and piston plug, is moved to a compression station C where a screw 32, operated by crank lever 34 is caused to press upon the piston head 28 in recess 36 provided therein for this purpose until the shoulder 30 is forced into engagement with the cylinder 10, thereby completely compressing the sample for the purpose of this invention.

Before applying pressure from the screw 32, the cylinder of powder is not in contact with the walls of the metal cylinder 10, the powder particles have some freedom of movement under pressure until restrained by the metal wall. The powder appears to have some further degree of compressibility, so that, for instance among cement samples varying enough in fineness and specific gravity to affect the bulking tendency, it is possible to compress a standard weight within the length allowed. It is conceivable that, with great pressure, enough packing could be developed as to impair the porosity of the bed so that the calculated value and the values obtained by direct observation would not represent the true porosity of the bed. Adjustment of the weight of the sample and degree of mechanical pressure is a matter for experiment not concerned with the present invention, which provides a means for compacting the sample into an accurately dimensioned cylinder in such condition as to satisfy requirements for the test.

The cylinder 10 with its sample thus compacted, then is removed from the press C and placed in testing frame D.

This frame is fastened to the table 11 immediately adjacent to the press C, and includes a frame having sides 36, 36', a top 38 and a bottom 40. The sides 36, 36' are bolted suitably to the table 11 by bolts 42, and the top 38 also is secured suitably, such as by screws 44. The top 40 has a hole 46 extending through it, into which hole is inserted snugly a pipe 48 which joins compressed air line 50.

A junction 51 connects pipe 48 with a branch pipe 52, this branch pipe opening under a piston head 54 positioned in a cylinder 56 mounted on the side frame members 36, 36'.

The piston head 54 actuates a piston rod 58, which is shown as extending through a hole 60 suitably provided therefor in table 11. A washer 62 is provided adjacent to the bottom end of the piston rod 58, and a cushioning coil spring 64 is retained around the rod 58 between washer 62 and table 11.

The piston rod 58 carries a plate 66 at its upper end, which bears against the bottom 40, which bottom is slidably mounted in the sides 36, 36', these sides 36, 36', forming guides for the movement of the bottom 40. A spring 67, mounted between the plate 66 and cylinder 56 cushions the movement of the plate. The bottom 40 and plate 66 are provided with connecting holes 68, 70, to the latter one of which is connected a tube 72, which opens to the atmosphere.

Pipe 50 is connected to a source of compressed air which is controlled by a valve 82, there being also a pressure chamber 84 in the line 50; and a pressure gage 86 also is in the line 50.

It will be understood that the powder sample 8 is of standard weight, and when properly compressed, as described above herein, the pressure which is required to force air through such standard bed is the value which, in accordance with the present invention, is to be measured.

Consequently, when the cylinder 10 is placed in the test frame and the valve 82 is opened, air flows through the pipes 50 and 52 beneath the piston head 54 to lift the bottom 40 against the cylinder 10, thereby tightly holding the cylinder 10 between the bottom 40 and the top 38. Air-tight engagements between the cylinder 10 and the top and bottom, respectively, are maintained by a washer 88 in the top 38 and the washer 90 in the bottom 40. A valve 92 preferably may be provided in the pipe 52 to direct the flow of air for lifting the piston head 54, thereby holding the cylinder in the frame properly clamped in place.

Then when the valve 92 is opened, air is admitted to the sample 8 and penetrates the sample, escaping from chamber 94 beneath the sample to the atmosphere through pipe 72. Pressure rises in the space 96 above the sample, this pressure rising to as much as 50 lbs. per square inch.

Figure 7:
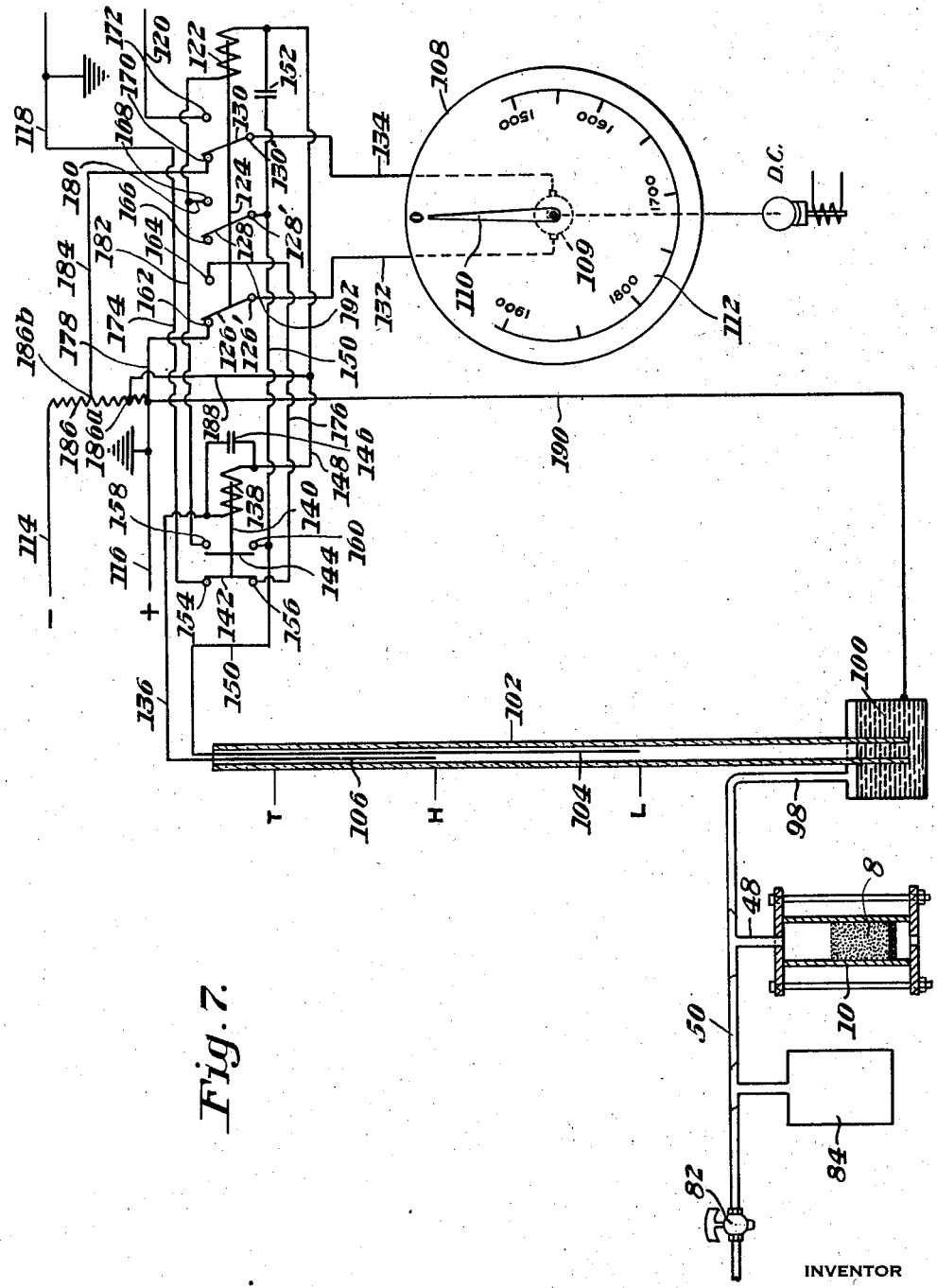
Fig. 7 is an enlarged diagrammatic view of the manometer equipment embracing the principles.
Figure 11:
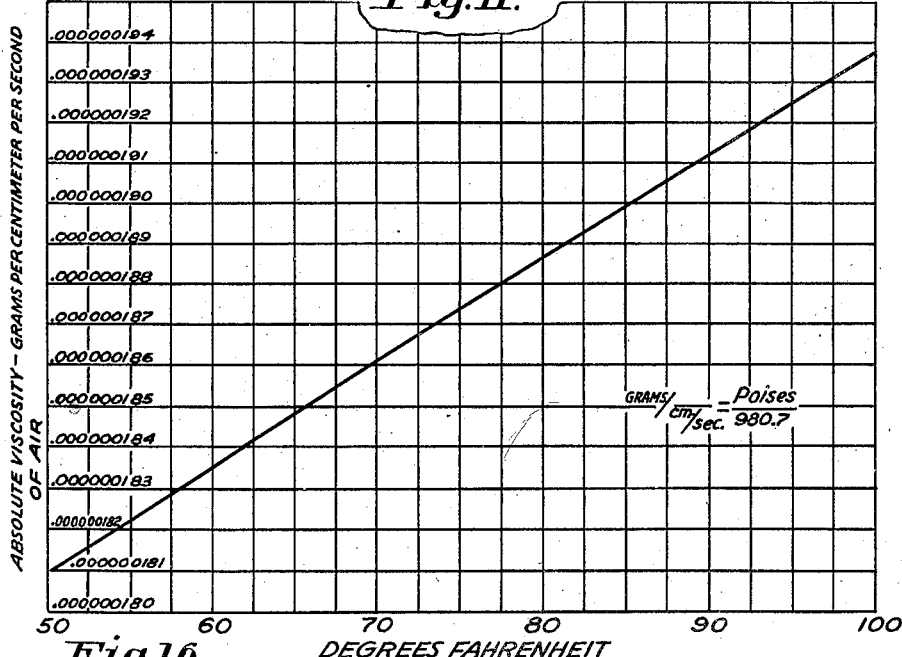
Figure 11 is a graph showing the relationship of absolute viscosity corresponding to various room temperatures.
Figure 16:
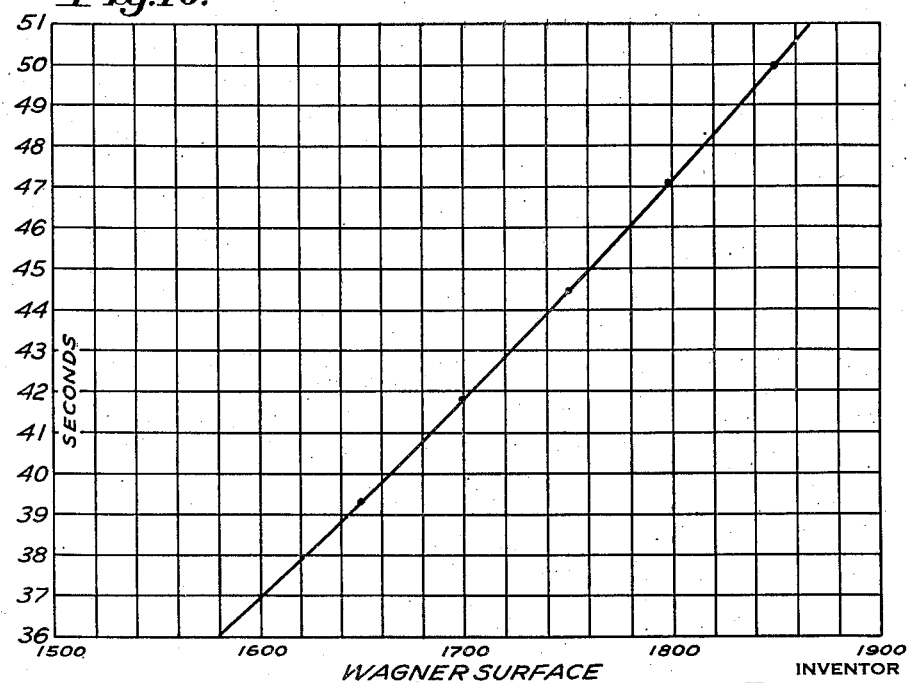
Figure 16 is a graph showing the relationship between the time in seconds and surface values as obtained from the Wagner Turbidimeter.
Figure 12:
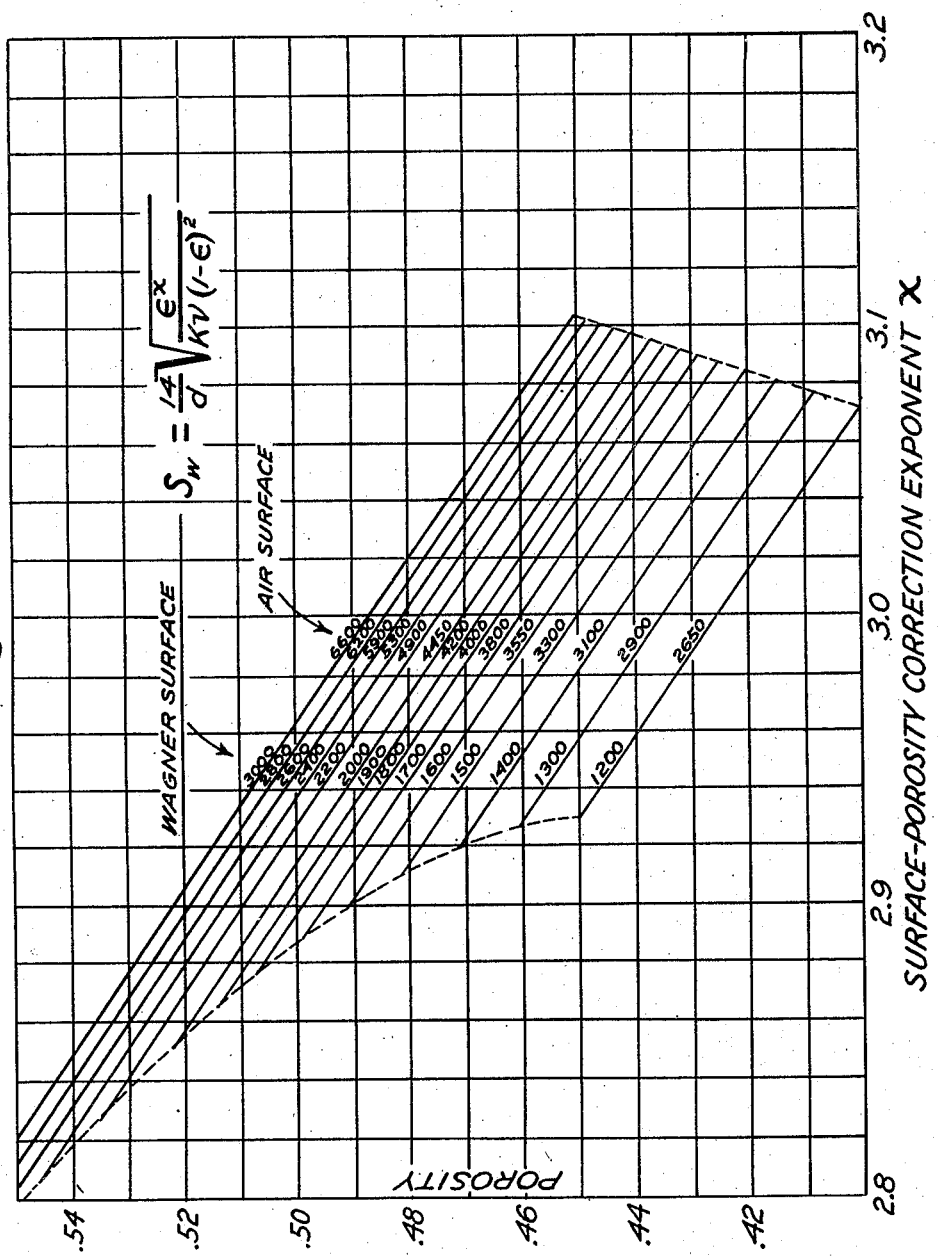
Figure 12 is a graph showing the relationship between surface porosity and surface porosity exponents.
Figure 13:
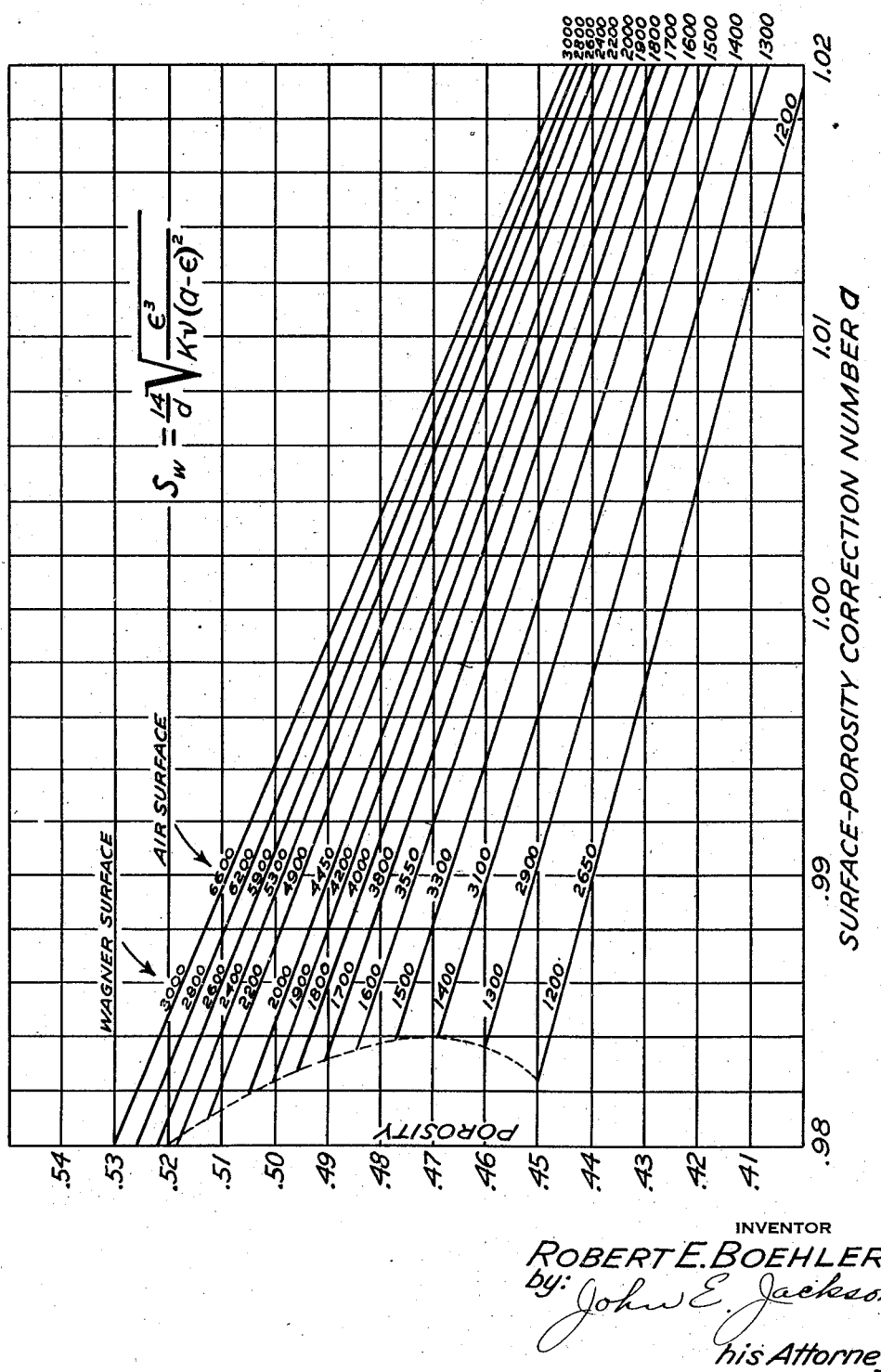
Figure 13 is a graph showing the relationship between surface porosity and surface porosity correction numbers.
Figure 14:
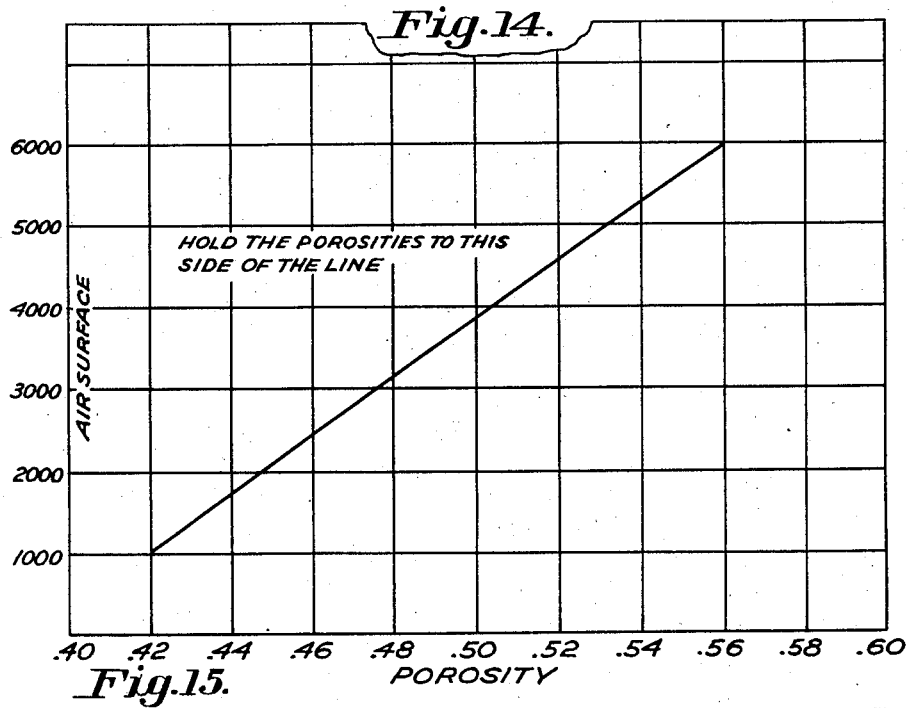
Figure 14 is a graph showing the relationship between different air surfaces and porosity.
Figure 15:
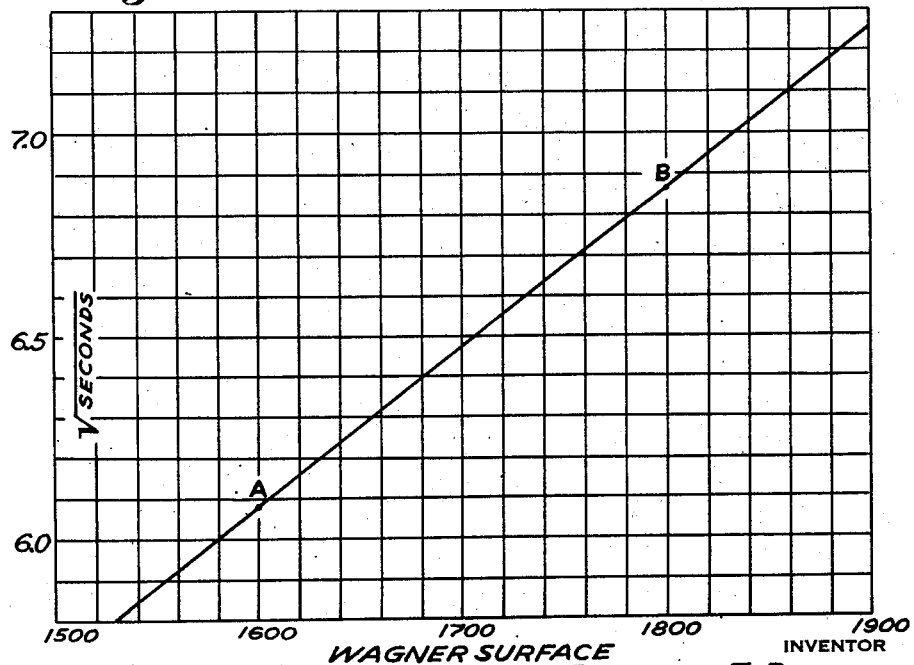
Figure 15 is a graph showing the relationship between the square root of the times and the surface values obtained by the use of the Wagner Turbidimeter.

Pipe 50 is connected to pipe 98 which opens into well 100, in which is mounted a manometer tube 102, containing contacts 104, 106 (Figure 7), contact 106 being the shorter, and terminating at a point H, the longer contact 104 terminating at a point L.

An electric clock 108 having a self-starting motor 109, (for example a motor of 1-R. P. M.) pointer 110, and dial 112, is provided. The clock motor 109 receives current from an alternating current supply line 118, 120, and is operative through the medium of a self-holding circuit including a relay coil 122 having a core 124 which carries contact arms 126, 128 and 130, arms 126 and 130 being connected at contacts 126' and 130' to leads 132 and 134 of the clock motor.

Gage contact 106 is connected through lead 136 to a relay coil 138, the core 140 of which carries contact arms 142, 144. A condenser 146 is connected across the coil 138, the coil 138 being connected to coil 122 through a lead 148 and to gage contact 104 through lead 150, in which is connected a condenser 152.

Switch arms 142, 144 are adapted to make and break engagement with the pairs of contacts 154, 156 and 158, 160, respectively, while the motor switch arms 126, 128 and 130 are adapted to make and break engagement with contacts 162, 164, 166, 168, 170, and 172. Of these, contact 166 is merely a stop, and is not electrified.

Contact 154 is connected to power line 118 through lead 174. Contact 156 is connected to contact 164 through lead 176. Also contact 162 is connected through lead 178 to the direct current line 116, contact 168 being connected through lead 180, to lead 182, which connects the solenoid coil 122 to contact 158. Contact 170 is connected through lead 184 to a suitable point 186b, on resistance 186 which is connected across the conductors 114 and 116, the adjustable contact of which resistance is connected, at point 186a, to lead 148 through lead 188, the end of resistance 186 being connected to the mercury well 100 through lead 190. Contact 164 is connected to lead 148 through lead 192.

Power supply lines 114, 116 supply direct current to the relay coils as well as to stop the motor 109 instantly when contact is broken at point L. This direct current applies a dynamic brake to the clock motor. This current supply is, for instance, 110 volt. D. C.

Current from the line 118—120 suitably may be a 60-cycle alternating current for driving the motor 109.

The condensers 146, 152 eliminate arcing when the mercury breaks contact at points H and L.

The relays are reset automatically for operations when contact is made at point H as the mercury is raised in the manometer.

The relay 138 is a two-pole type, with one contact normally open and one normally closed, while contact relay 122 is a triple pole double throw type of relay.

When the operation of the device is as follows:

When the valve 82 is opened, air enters the pipe 50 and raises the mercury in the well 100 to a certain level, such as the point T, which is constant under the pressure of the air in the pipe 50. This point is usually, in practice, about 30 inches high. As the mercury is raised in the tube 102, a circuit is established through lead 136 and coil 138 which closes the contacts 158, 160 and opens 154 and 156. When contacts 158—160 close, current is established through lead 148 through relay coil 122, to close this relay.

This action causes an alternating current circuit to be completed by pulling arm 126 from contact 162 into engagement with contact 164, arm 128 from the stop 166 into engagement with contact 168, and arm 130 from contact 172 into engagement with contact 174, thus setting the clock motor 109 in readiness for operation instantly upon closing contacts 154, 156, which remain open as long as the mercury is in engagement with the manometer contact 106, such engagement of the mercury maintaining coil 138 energized and contacts 158 and 160 are maintained closed.

Coil 122, however, is in a self-holding circuit, maintained by engagement of arm 128 in contact with contact 168. As the mercury falls, along the manometer contacts 104, 106, until the mercury breaks engagement with the contact 106 at the point H. This break at H deenergizes coil 138 which automatically closes contacts 154, 156, thus instantly starting the clock motor 109, the circuit including coil 122 being self-holding until engagement of the mercury with contact 104 is broken at L, which deenergizes coil 122 and instantly returns the motor contacts to their position shown in Figure 7, thereby instantly applying a direct current to the clock motor to stop the same instantaneously.

For the next test, as the mercury rises again to point T, nothing happens in the circuits until the mercury reaches the point H at the contact 106, when the system becomes set again for motor 109 to start as contact is broken at H on the descent of the mercury during the next test, the clock motor 109 running during the fall of the mercury between the points H and L, a direct current being applied to motor 109 immediately stopping the motor responsively to the mercury falling below point L.

In the apparatus of the present invention, the time of flow is determined, and the timing is automatic. Also, in the present case, the pressure varies from H to L, and consequently, the volume rate per second varies also from second to second.

At the initial stage, with mercury at H, let the pressure be $P_1$. With mercury at point L, let the pressure be $P_L$. The volume of air under pressure is a constant. Let this volume be V. From the gas laws, as expansion takes place under flow, air leaves the system through the sample, so that the mass of air continually decreases. The gas law states that $$PV = nRT$$

in which $n$ is the number of mols of gas in volume V, R the gas constant, and T the absolute temperature.

Let $n_1$ be the mols of air in volume V at the initial stage and $n_2$ at the final stage.

Then:

$$P_1 V = n_1 RT$$

and $$P_2 V = n_2 RT$$

Combining these $$n_1 - n_2 = \frac{(P_1 - P_2)V}{RT}$$

Therefore if the volume of the metal system were to be determined, the volume or mass of air flowing through the sample can be calculated as mols, $(n_1-n_2)$, or as a portion of the volume of the metal system. The only variable determined in the test is the time required for it to pass through the test bed, which time depends on the fineness of the sample.

In the present apparatus, the pressure varies, constantly decreasing, throughout the period of the test. As related to the prior art, the improved apparatus differs in that a definite quantity of air is made to pass through the sample, under a pressure which varies between definite limits and the time elapsed is used to relate the varying flow rate with surface, the instrument being calibrated by testing samples of known surface therein determined.

It will be understood of course, that while air is illustrated and described herein as the penetrating fluid, other fluids may be used in a similar manner so long as they are inert to the particular powder being tested. Thus a mobile oil might be used in the case of powders not reacted upon by water. Consequently air may be regarded as illustrative of a fluid that is found to be satisfactory in practice.

The apparatus described above may be rendered portable by mounting the same on a truck, the table 11 forming a platform which carries the testing mechanism which is mounted on a truck 212 provided with wheels 213 and a handle 214 for pulling the truck to a desired location for use. Mounted on the truck 212 is the compressor 215 interconnected through a pressure tank 216 with the cleaning and testing instrumentalities and with a suction pump 217 which is connected through a suction tank 218 with the evacuating station for initially compacting the sample. The apparatus therefore is made into a portable unit which can be transported readily around the slant to any desired location for use.

Upon completion of the test, the tested sample must be removed. To do this the cylinder 10 is inverted under a nozzle 200 which receives compressed air from line 201, the air supply being controllable through a valve 202. For holding the inverted cylinder for expulsion of the sample, an abutment plate 203 is secured to the top of table 11, as by bolts 204, into which plate is threaded a waste pipe 205 communicating with bag 206 for receiving the waste.

A bracket 207 which extends substantially vertically from the table likewise is bolted thereto by one of the bolts 204, the bracket 207 seating on the plate 203. At the top of the bracket is positioned a lever 208 which is pivoted at 209 to the bracket 207, the lever 208 having a hole through it to accommodate the nozzle 200, and has a gasket 210 secured to it by screws 211. The lever 208 provides a convenient means for clamping the cylinder 10 in inverted position for blowing out the compacted sample to clean the cylinder.

While the illustrated embodiment of the invention herein specifically illustrated and described involves the use of a direct current for the relay coils and as a brake for stopping the timing motor, and an alternating current supply for running the motor, it will be apparent that the same sequence of control operations may be obtained with either a single source of direct current or a single source of alternating current, thereby eliminating the necessity of having both A. C. and D. C. current supplies, by providing a shunt-type motor having a constant speed without a load with a magnetic brake applied either to the gear trains in the motor or to the motor shaft. A universal motor of this type, operating on either direct current or alternating current is available as a standard piece of equipment, which adapts itself readily for use as the timing motor.

What is claimed is:

1. Testing apparatus for measuring surface of comminuted powders, which comprises, in combination, a supply of compressed air, a chamber for holding a supply of compressed air under line pressure, mechanism for passing compressed air from the chamber through the sample, pressure-indicating means including a mercury manometer connected to the compressed air line, control valves for controlling the supply of compressed air to the chamber, sample and pressure-indicating means, a pair of elongated conductor members in the manometer one of which conductors is shorter than the other and disposed so that the shorter conductor is engaged last by the mercury in the manometer as the mercury rises under line pressure of compressed air, timing mechanism, first and second relay coils, a first direct current circuit including the first relay coil and the shorter manometer contact, whereby the mercury rising into engagement with the shorter contact causes the said relay coil to be energized, a second direct current circuit including the second relay coil, contact means for closing the said second direct current circuit responsively to energizing the first relay coil, thereby energizing the second relay coil, a self-starting timing mechanism, an alternating current circuit for operating the timing mechanism, contact members for the timing mechanism operated by the second relay coil, the said contact members normally placing the timing mechanism in an inoperating direct current circuit, while being shiftable responsively to energizing the second relay coil into operative engagement with the alternating current circuit, contact members operable responsively to deenergizing the first relay coil incidently to disengagement of the mercury from the shorter manometer contact for closing the alternating current circuit as the mercury falls responsively to passing compressed air from the chamber through the sample, means for maintaining the second relay coil and alternating current circuit through the timing motor self-holding as the mercury continues to fall during passage of air through the sample until the mercury disengages the longer manometer contact, thereby deenergizing the second coil and instantaneously returning the timing mechanism to direct current circuit, thereby applying direct current to the mechanism as a dynamic brake to instantaneously stop the timing mechanism, which thereby automatically indicates the time of fall of the mercury between the manometer contacts, and means for indicating the said time in terms of surface values.

2. Testing apparatus for measuring surface of comminuted powders, which comprises, in combination, a supply of compressed air, a chamber for holding a quantity of compressed air under line pressure, mechanism for passing compressed air from the chamber through the sample, indicating means including a mercury manometer connected to the compressed air line, control valves for controlling the supply of compressed air to the chamber, sample and pressure-indicating means, a pair of spaced contact elements in the manometer, one of the contact elements being substantially shorter than the other, a supply of direct current, a first relay coil in circuit with the supply of direct current and the shorter of the said contact elements, whereby the said coil becomes energized upon the mercury in the manometer being raised by pressure of compressed air until contact of the mercury with the shorter contact element is effected, a core for the said coil, a pair of double contact arms on the core adapted to make and break contact with a corresponding pair of double contacts, a second relay coil is parallel with the first of the said relay coils, a supply of alternating current, timing mechanism adapted to be operated by the supply of alternating current, contact elements operated by the second relay coil for controlling operation of the timing mechanism for shifting the timing mechanism between the supply of direct current and the supply of alternating current, a self-holding circuit for the second coil, whereby the second coil remains in circuit with the source of direct current and with the contact elements of the manometer, a source of alternating potential, self-starting timing mechanism adapted to be operated by the alternating current, instrumentalities rendering the said timing mechanism operative during fall of mercury through a predetermined distance, and means for applying a dynamic brake to the timing mechanism for rendering the timing mechanism instantaneously out of operation responsively to completion of fall of the mercury through the said predetermined distance.

3. Testing apparatus for measuring surface of comminuted powders, which comprises, in combination, a supply of compressed air, a chamber for holding a supply of compressed air under line pressure, mechanism for passing compressed air from the chamber through a prepared sample of the powder, pressure-indicating means including a mercury manometer connected to the compressed air line, control valves for controlling the supply of compressed air to the chamber, sample and pressure-indicating means, a plurality of contact members in the manometer, one of which members is an actuating contact member and another of the said members is a holding contact member, the said members being spaced apart in direction of movement of mercury in the manometer, an actuating circuit including the actuating contact and a source of current, the actuating circuit becoming energized responsively to lifting of the mercury into engagement with the said initiating contact responsively to impressment of line pressures on the mercury, a second circuit energized responsively to energization of the actuating circuit, timing mechanism, a circuit for the timing mechanism rendered actuable by energizing the second circuit, a holding circuit for the said second circuit, the holding circuit including the holding manometer contact member, and means for closing instantaneously the circuit for the timing mechanism responsively to disengagement of the mercury from the actuating contact member responsively to fall of the mercury incident to reduction of pressure as air is passed through the sample.

4. Testing apparatus for measuring total surface in a bed of comminuted powders, which comprises, in combination, a source of compressed air, a chamber for holding a supply of compressed air to be passed from the chamber through the sample, pressure-indicating means including a mercury manometer connected to the compressed air line, control valves for controlling the supply of compressed air to the chamber, sample and pressure-indicating means, first and second contact members in the manometer, one of which members is an actuating contact member and the other of the said members is a holding member, the said members being spaced apart in direction of movement of mercury in the manometer, an actuating circuit including the actuating contact and a source of current, the actuating circuit becoming energized responsively to lifting of the mercury into engagement with the said initiating contact member responsively to impressment of line pressures on the mercury, a second circuit energized responsively to energization of the actuating circuit, timing mechanism, a circuit for the timing mechanism rendered actuable by the energizing of the said second circuit, the holding circuit including the holding manometer contact member, means for closing instantaneously the circuit for the timing mechanism responsively to disengagement of the mercury from the actuating contact member responsively to the fall of the mercury incident to reduction of pressure as air is passed through the sample, the circuit for the timing mechanism thereby being closed responsively to deenergizing the actuating circuit while the holding circuit maintains the said second circuit closed and energized as long as the mercury is in contact with the holding contact member in the manometer, and means for braking the timing mechanism to stop the same responsively to disengagement of the mercury with the holding contact member.

5. Testing apparatus for measuring total surface in a bed of comminuted powders, which comprises, in combination, a source of compressed air, a chamber for holding a supply of compressed air received from the source thereof, means for passing compressed air from the chamber through the sample, pressure indicating means including a mercury manometer connected to the compressed air line, control valves for controlling the supply of compressed air to the chamber, sample and pressure-indicating means, first and second contact members in the manometer, one of which members is an initiating contact member and the other of the said members is a holding contact member, the said members being spaced apart in direction of movement of mercury in the manometer, an actuating circuit including the actuating contact, and a source of current, the actuating circuit becoming energized responsively to lifting of the mercury into engagement with the said initiating contact member responsively to impressment of line pressures on the mercury, a second circuit energized responsively to energization of the actuating circuit, timing mechanism, a circuit for the timing mechanism rendered actuable by the energizing of the said second circuit, a holding circuit for the said second circuit, the holding circuit including the holding manometer contact member, means for closing instantaneously the circuit for the timing mechanism responsively to disengagement of the mercury from the actuating contact member responsively to fall of the mercury incident to reduction of pressure as air is passed through the sample, the circuit for the timing mechanism thereby being closed responsively to deenergizing the actuating circuit while the holding circuit maintains the said second circuit closed and energized as long as the mercury is in contact with the holding contact member in the manometer, means for braking the timing mechanism to stop the same immediately responsively to disengagement of the mercury with the holding contact member, whereby the timing mechanism indicates the time required for the mercury to fall between the two manometer contacts, thereby indicating time of flow of standard volume of air through the sample, and means for indicating the said time in terms of surface.

6. Testing apparatus for measuring surface of comminuted powders, which comprises, in combination, a container for receiving a known amount of a prepared sample of the powder to be tested, a supply of compressed air, means for indicating line pressure of the compressed air, a chamber for holding a supply of compressed air under line pressure, mechanism for passing compressed air from the chamber through the powder container in the said container, indicating means for measuring line pressure, a first control valve for controlling the supply of compressed air to the chamber and pressure-indicating means, a second valve for controlling flow of compressed air to the sample, whereby, upon closing of the first valve and opening of the second valve, air from the chamber passes through the sample with corresponding continuous reduction of pressure in the pressure-indicating means, and timing mechanism operated by the pressure-indicating means for indicating time of passage of a constant volume of air through the sample and for translating the said time into surface measurements.

7. Testing apparatus for measuring surface of comminuted powders, which comprises, in combination, a source of compressed air, means for indicating line pressure of the compressed air, a chamber for holding a supply of compressed air from the source under line pressure, mechanism for passing compressed air from the chamber through the sample, indicating means including a mercury manometer connected to the compressed air line, control valves for controlling the supply of compressed air to the chamber, sample contained therein, and pressure-indicating means, a pair of vertically spaced-apart contact elements in the manometer, and timing mechanism adapted to be operated responsively to fall of mercury in the manometer through the space between the said contact elements, and means for converting the resulting time of fall into surface measurements.

8. A method of testing powdered materials for determining total surface thereof, which comprises introducing a weighed sample of the powder into a testing receiver therefor, evacuating entrained air from the sample and correspondingly partially compacting the sample, further compressing the sample into a standard volume, passing a measured volume of compressed air through the compressed sample, measuring a standard volume of air passing through the sample, and measuring in terms of surface, the time required for the volume of air to pass through the sample.

ROBERT E. BOEHLER.